(12) United States Patent
Manzoor et al.

(10) Patent No.: US 7,905,159 B2
(45) Date of Patent: Mar. 15, 2011

(54) TORSIONAL VIBRATION DAMPER

(75) Inventors: Suhale Manzoor, Cement City, MI (US); Bruce Christenson, Canton, MI (US)

(73) Assignee: Metavation, LLC, Wilmington, DE (US)

( * ) Notice: Subject to any disclaimer, the term of this patent is extended or adjusted under 35 U.S.C. 154(b) by 1251 days.

(21) Appl. No.: 11/425,924

(22) Filed: Jun. 22, 2006

(65) Prior Publication Data

US 2007/0295569 A1    Dec. 27, 2007

(51) Int. Cl.
  *F16F 15/12*    (2006.01)
(52) U.S. Cl. .......................................... 74/574.4
(58) Field of Classification Search ............... 74/574.4; 29/4.51, 451; 188/30, 130; 123/192.1; 464/90
See application file for complete search history.

(56) References Cited

U.S. PATENT DOCUMENTS

| | | | | |
|---|---|---|---|---|
| 1,949,520 A | * | 3/1934 | Whisler | 74/574.4 |
| 3,196,710 A | * | 7/1965 | Peirce | 74/574.4 |
| 3,479,907 A | * | 11/1969 | Hall | 74/574.4 |
| 4,023,438 A | * | 5/1977 | Birkle et al. | 74/574.4 |
| 4,850,243 A | * | 7/1989 | George | 74/574.4 |
| 6,675,759 B2 | * | 1/2004 | Johnson et al. | 123/192.1 |
| 7,437,808 B2 | * | 10/2008 | Hodjat | 29/4.51 |
| 2004/0159507 A1 | * | 8/2004 | Allport | 188/130 |
| 2008/0034918 A1 | * | 2/2008 | Manzoor et al. | 74/574.4 |
| 2009/0078079 A1 | * | 3/2009 | Manzoor et al. | 74/574.4 |
| 2010/0120544 A1 | * | 5/2010 | Mehlan et al. | 464/90 |

FOREIGN PATENT DOCUMENTS

WO    WO 2006/070422    *    7/2006

* cited by examiner

*Primary Examiner* — Vinh T. Luong
(74) *Attorney, Agent, or Firm* — Snell & Wilmer L.L.P.

(57) ABSTRACT

A torsional vibration damper having a hub carrying a radially projecting flange and an annular inertia mass defining an annular channel encompassing the radially projecting flange and an elastomeric member. An annular compression ring is attached to the opening of the annular channel to axially compress and extrude the elastomeric member to fill the annular channel around the radial flange within the inertia ring. Projections defining an intermittent annular inner rim of the inertia mass extend through openings between the spokes of the hub and cooperate with an annular outer rim of the inertia mass to retain the compression ring.

13 Claims, 3 Drawing Sheets

TORSIONAL VIBRATION DAMPER

FIELD OF INVENTION

Figure 1:
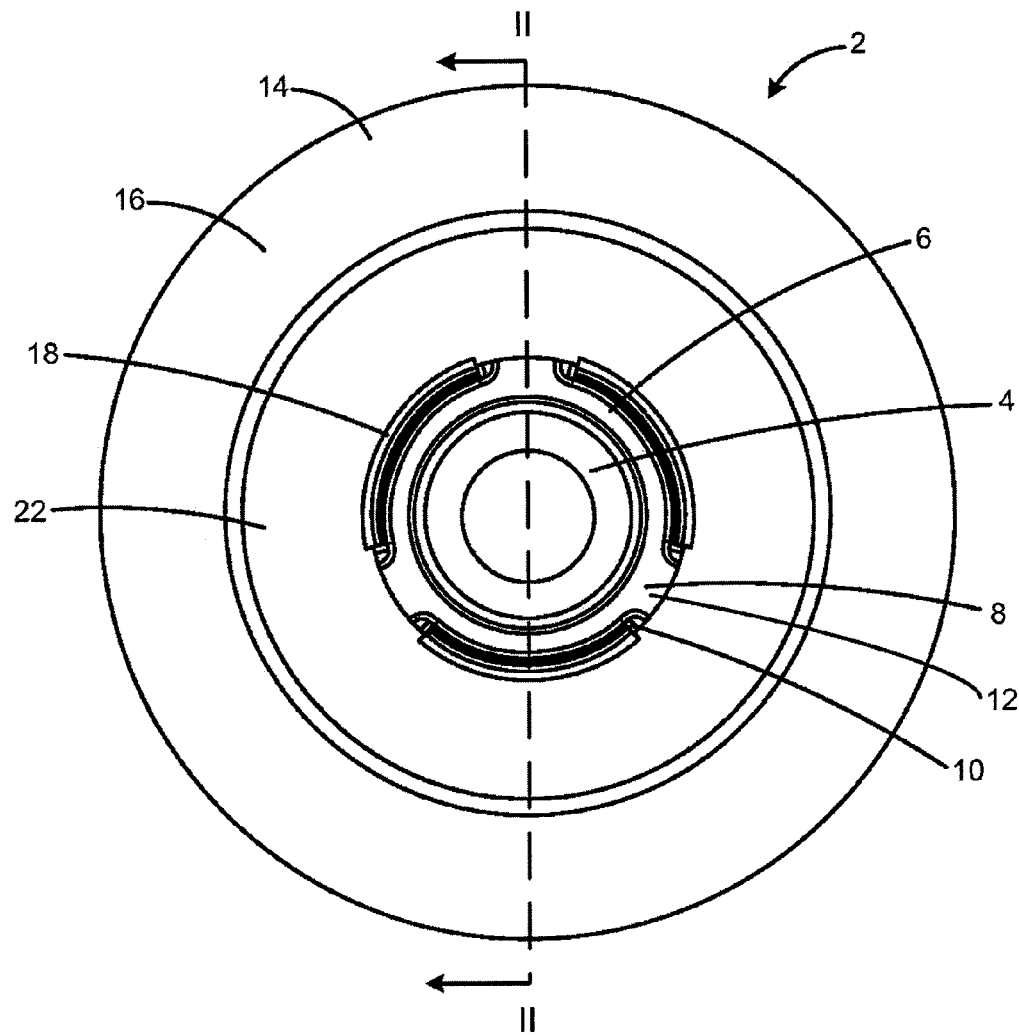

This invention generally relates to torsional vibration dampers.

BACKGROUND OF THE INVENTION

Torsional vibration dampers are commonly associated with drive mechanisms and power transfer systems, such as crankshafts of piston engines, electric motors, transmissions, drive shafts, and the like. The primary purpose of a vibration damper is to reduce the amplitude of vibrations in such systems, as excessive vibration may cause system noise, wear, fatigue and catastrophic failure. Such systems typically experience vibration from multiple sources, such as, for example, firing of different engine cylinders, crankshaft imbalances, meshing of gears in transmissions, shaft misalignment, and movement of universal joints.

Common vibration dampers include a hub for mounting the damper to a crankshaft and an annular inertia ring driven by the hub through an elastomeric member compressed between the hub and inertia ring. The outer hub rim and corresponding inner rim of the inertia ring are often coextensive and configured to provide surface area for distribution of the shear forces in the elastomer. Such dampers typically are tuned to a particular range of vibration frequencies which are determined as a function of the material properties and geometry of the elastomeric member, inertia ring and hub. Rotation of the mass of the inertia ring generates active inertia, which in combination with the cyclical stressing of the elastomer serves to resist the axial and torsional vibrational movement of the crankshaft.

One common type of damper is produced by adhering or forming the elastomeric member on either the hub or ring and by then deforming or heating the hub or inertia ring to fit within or over the corresponding hub-elastomer or inertia ring-elastomer subassembly. For example, a hub-elastomer subassembly having the elastomer molded to the peripheral face of the hub is pressed through a converging tube to radially compress the elastomeric member. The inertia ring is radially expanded through heating and is positioned around the end of the converging tube to receive the compressed hub-elastomer subassembly. The combined expansion of the elastomeric member and subsequent thermal restriction of the inertia ring create sufficient compression in the elastomeric member to secure the inertia ring to the hub. Similarly, the inertia mass may simply be press-fitted onto the hub-elastomer sub-assembly, compromising the elastomeric member.

Such assembly methods may cause defects or residual stresses or may otherwise compromise the integrity of the elastomeric member, causing premature failure of the damper. Such assembly methods also may produce imbalances in the damper, necessitating use of weights or balance drilling to properly balance the damper.

Certain inefficiencies of the damper itself may reduce the overall efficiency or lifecycle of the drive system or peripheral systems. On such inefficiency, parasitic vibration, may be caused by misalignment of a damper hub on a drive shaft or by damage or wear to the shaft or damper, such as deterioration of the elastomeric member. Similarly, parasitic vibration may be caused by irregularities, imbalances, or defects caused in the production of the damper or by subsequent deterioration caused by such defects.

Another inefficiency of conventional dampers is parasitic inertia. Parasitic inertia is generated by mass that creates a torsional load on the dampened system but does not significantly contribute to the active inertia of the damper. For example, parasitic inertia may be generated by any mass of the damper that is located radially inward of the inertia mass.

Accordingly, there exists a need for a more efficient vibration damper providing reduced parasitic vibration and reduced parasitic inertia. Similarly, a need exists for a method of manufacturing a vibration damper that does not create undue residual stresses or defects in the elastomeric member.

SUMMARY OF THE INVENTION

While the way that the present invention addresses the disadvantages of the prior art will be discussed in greater detail below, in general, the present invention provides a vibration damper in which an elastomeric member is axially compressed between a radial flange projecting from a hub, a compression ring, and an annular inertia mass encompassing the elastomeric member and the radial flange.

According to one exemplary embodiment of the invention, a generally C-shaped inertia mass includes a continuous annular outer rim and an intermittent annular inner rim connected by a radially extending sidewall, together defining an annular channel. The outer rim and projections defining the intermittent inner rim further include features for retaining an annular compression ring that is swaged into or otherwise secured over the annular channel of the inertia ring.

In an exemplary embodiment, the hub includes a spoked web and a radial flange extending from the spoked web and positioned within the annular channel of the inertia ring. The projections of the inner rim extend through the openings between the hub spokes. An elastomeric member is compressed axially between the channel sidewall, radial flange, and compression ring and is thus extruded to fill the channel.

BRIEF DESCRIPTION OF THE DRAWING FIGURES

Figure 2:
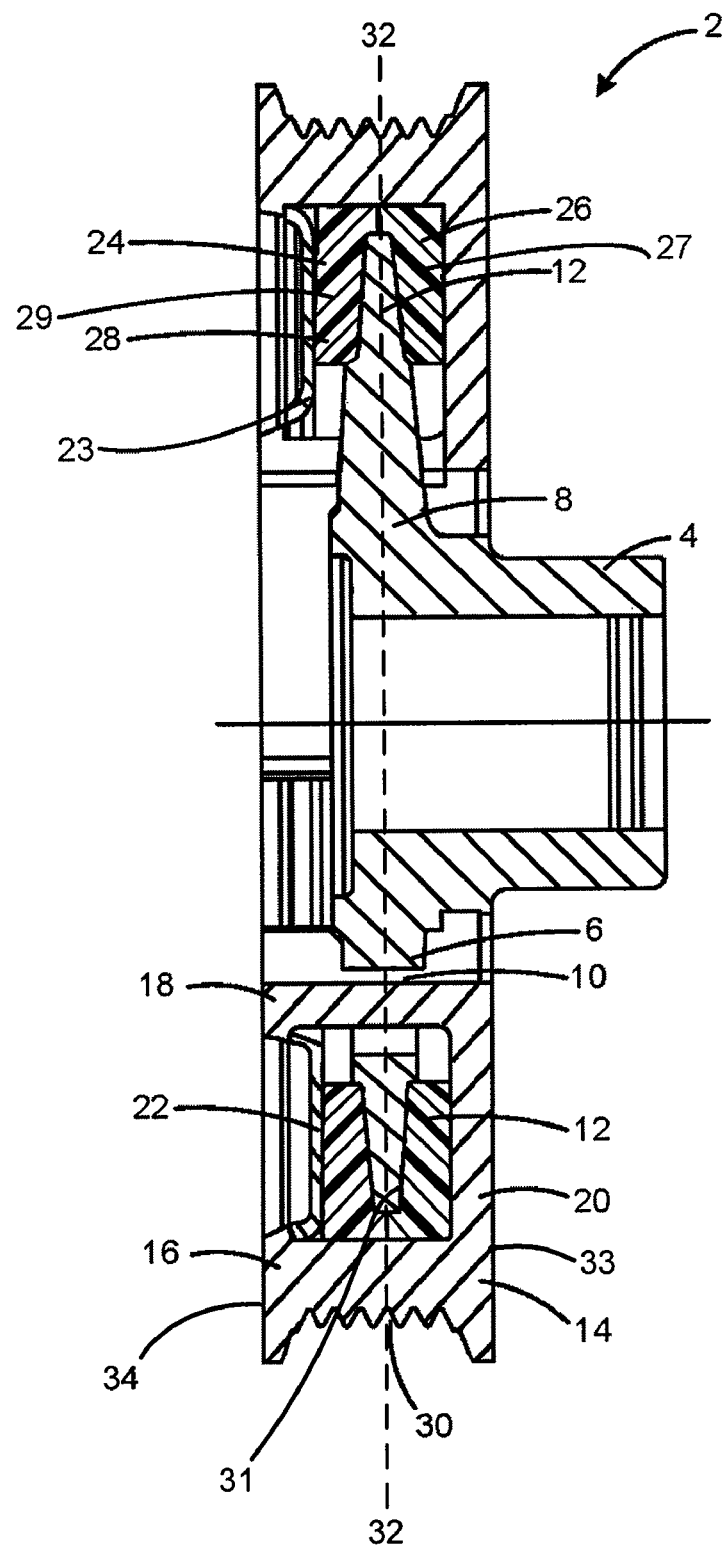
Figure 3:
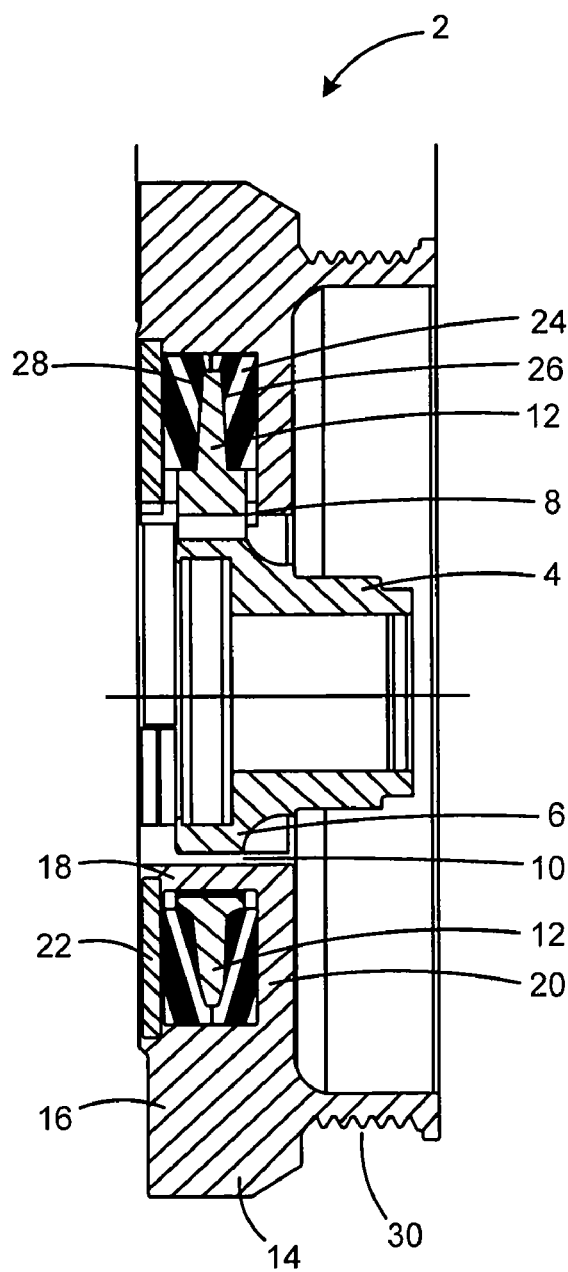

A more complete understanding of the present invention may be derived by referring to the detailed description and claims when considered in connection with the drawing Figures, wherein like reference numerals refer to similar elements throughout the Figures, and FIG. 1 illustrates a front view of an exemplary damper according to one embodiment of the present invention;

FIG. 2 illustrates a longitudinal cross-sectional view of the exemplary damper of FIG. 1 along plane II; and FIG. 3 illustrates a longitudinal cross-sectional view of an exemplary damper according to another embodiment of the present invention, which has an integral drive pulley formed on a rear sidewall of the inertia ring.

DETAILED DESCRIPTION OF EXEMPLARY EMBODIMENTS

The following description is of certain exemplary embodiments of the present invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without limiting or diminishing the scope of the invention as set forth herein. It should be appreciated that the description herein may be adapted to be employed with alternatively configured devices having different shapes, components, materials and the like and still fall within the scope of the present invention. Thus, the detailed description herein is presented for purposes of illustration only and not of limitation.

A torsional vibration damper according to various embodiments of the present invention includes an annular inertia mass having an annular channel encompassing a radial flange formed on the damper hub. Torque and vibration are transferred from the hub to the inertia mass through an elastomeric member compressed between the lateral faces of the radial flange of the hub, the sidewall of the annular channel, and an annular compression ring attached to the inertia mass.

In various embodiments, the radial flange is tapered such that the two portions of the elastomeric member are compressed into a dual common vertex configuration in which the vertex 31 of the radial flange lies on the centerline of the axis of rotational inertia 32 of the damper. This allows the elastomeric member portions to be in a state of uniform stress throughout their cross-sections. The first and second elastomeric member portions may be selected, sized and shaped to tune the damper. Alternatively, a single integral elastomeric member may be fitted over both faces of the radial flange before assembly of the inertia mass to the hub.

Parasitic inertia and vibration are reduced by replacing the conventional lateral flange portion of the hub with a radial flange, aligning the radial flange with the hub web and by extending the mass of the radial flange partially into the active or working inertia range of the inertia mass itself. One embodiment of the present invention reduces parasitic inertia by approximately 80% while increasing the working inertia by approximately 30% with approximately 7% increase in total inertia compared to conventional damper designs.

In an exemplary method of manufacturing a torsional vibration damper according to one embodiment of the present invention, a hub is formed with a spoked web and a radial flange extending from the web. An inertia mass is formed with a substantially continuous outer rim and an intermittent inner rim such that multiple projections defining the intermittent inner rim extend through the openings between the spokes of the hub web. A sidewall connects the outer and inner rims of the inertia mass defining an annular channel encompassing the radial flange of the hub.

A first elastomeric member portion is positioned between one face of the radial flange and the sidewall of the inertia mass. A second elastomeric member portion is positioned adjacent an opposite face of the radial flange. A compression ring, which may also contribute to the active inertia of the damper, is then coupled to the inertia mass, placing the elastomeric member portions into compression between the respective faces of the radial flange, inertia mass, and compression ring.

The vibration damper may be assembled by stacking the hub, elastomeric member, and inertia ring, then compressing and retaining the compression ring. Damper inefficiencies and the need for post-assembly balancing are also reduced through uniform compression of the elastomeric member during assembly. Machining of component surfaces may be performed on individual components or on the assembled damper.

With reference now to FIG. 1, a torsional vibration damper 2 according to one exemplary embodiment of the present invention includes a hub 4 configured for attachment to the end of a crankshaft of an internal combustion engine. Hub 4 may include a bore, collar, or other mechanism now known or hereafter developed for receiving the end of the crankshaft and a keyway for transmission of torque applied by the crankshaft. Hub 4 includes a radially extending web 6 having a plurality of spokes 8 defining openings 10 in web 6. Hub 4 may be formed from any material suitable to withstand the forces applied to damper 2, such as, for example, grey iron, ductile iron, steel, aluminum, reinforced plastic, or other suitable materials.

Exemplary damper 2 further includes an inertia mass 14 having a substantially continuous annular outer rim 16, an intermittent annular inner rim 18, a front portion 33 and a rear portion 34. Outer rim 16 comprises a mass of metal or other material suitable to serve as a flywheel and to withstand the rotational vibrations transferred by hub 4 from the crankshaft. Intermittent annular inner rim 18 projects through openings 10 formed in hub 4 with sufficient clearance to prevent contact between inertia mass 14 and hub 4 during use.

A compression ring 22 attaches to inner rim 18 and outer rim 16 at their forward edges. Compression ring 22 may be attached to inertia mass 14 by features formed on inertia mass 14 or by swaging, welding or the like, or with rivets, bolts, or other fasteners. For example, inner rim 18 and outer rim 16 may include an annular shoulder for retaining compression ring 22. Compression ring 22 may fit between or over rims 16 and 18 or may form a continuation thereof. In various embodiments, compression ring 22 may comprise a substantial mass and may thus form an extension or forward portion of inertia mass 14. Alternatively, compression ring 22 may comprise multiple angularly-spaced segments. Compression ring 22 may be made from any material suitable to generate the appropriate compressive forces, such as, for example, steel, iron, aluminum or other suitable metal or non-metal material.

With reference now to FIG. 2, a radial flange 12 extends from web 6 beyond spokes 8 of hub 4. Radial flange 12 may be integral to hub 4, or may be attached thereto. Radial flange 12 tapers distally towards an apex substantially aligned with the axis of rotational inertia of damper 2. In various other embodiments, radial flange 12 may be of uniform thickness, may be continuous, or may comprise multiple angularly-spaced segments. In other embodiments, radial flange 12 may include axial flanges along a face of radial flange 12 or along the periphery of angularly spaced segments of radial flange 12.

Inertia mass 14 further includes a rearward sidewall 20 connecting outer rim 16 and inner rim 18 to define an annular channel encompassing radial flange 12. Outer rim 16, sidewall 20, and inner rim 18 form an integral inertia mass 14 having a generally C-shaped cross-section. In various embodiments, compression ring 22 may include an annular recess 23 complementary to the annular channel formed by inertia mass 14. For example, compression ring 22 may have a generally C-shaped or L-shaped cross-section to complement the corresponding cross-section of inertia mass 14. Inertia mass 14 may further include an annular drive pulley track 30 formed on the outer face of outer rim 18 as shown in FIG. 1 or, alternatively, attached to the rear of sidewall 20 as shown in FIG. 3.

With continued reference to FIG. 2, in an exemplary embodiment, an elastomeric member 24 is disposed in the annular channel of inertia mass 14 with a first portion 26 (e.g. rear portion 27) of elastomeric member 24 disposed between a first rearward face of radial flange 12 and sidewall 20 and a second portion 28 (e.g. front portion 29) disposed between compression ring 22 and a second forward face of radial flange 12. Elastomeric member 24 is compressed during attachment of compression ring 22 to inertia mass 14 and is extruded substantially radially to contact the radial walls of the annular channel of inertia mass 14. Accordingly, elastomeric member is substantially uniformly compressed between inertia mass 14 and hub 4.

Portions 26 and 28 of elastomeric member 24 may be tapered to complement a tapered radial flange 12 or may be of uniform thickness. Portions 26 and 28 of elastomeric member 24 may be formed of different elastomers or with different proportions to tune damper 2, or may be integrally formed of a single elastomer. For example, portion 26 may be formed of a stiff elastomer selected to withstand the higher temperatures adjacent the engine, while portion 28 may be formed of a softer elastomer having reinforcing fibers to produce desired combined properties of elastomeric member 24. Portions 26 or 28 may alternatively be bonded to radial flange 12 or inertia mass 14 or may be molded thereto. Elastomeric member 24 may include any number of different segments, layers, or elastomers. Elastomeric member 24 may include EPDM, Nitrile, SBR, PBD, natural rubber, any other suitable elastomeric material and blends or combinations thereof.

Finally, while the present invention has been described above with reference to various exemplary embodiments, many changes, combinations and modifications may be made to the exemplary embodiments without departing from the scope of the present invention. For example, the inertia mass, web, and radial flange may be configured in any manner suitable to provide for compression of the elastomer between the radial flange and the inertia mass. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A torsional vibration damper comprising:
   a hub having spokes defining openings therein;
   a radial flange extending laterally from said hub, said flange having a first face and a second face;
   an inertia mass associated with said hub, said inertia mass comprising:
      an annular outer rim;
      an intermittent annular inner rim projecting through said openings between said spokes;
      a sidewall connecting said outer rim and said inner rim to define an annular channel encompassing said radial flange;
   an elastomeric member having a first portion disposed between said first face of said radial flange and said sidewall and a second portion disposed adjacent said second face of said radial flange; and
   a compression ring attached to at least one of said outer rim and said inner rim of said inertia mass over said annular channel such that said first and second elastomeric member portions are substantially axially compressed and substantially radially extruded in said annular channel.

2. The damper of claim 1, wherein said radial flange is tapered towards a vertex that substantially coincides with the axis of rotational inertia of the damper.

3. The damper of claim 1, wherein said first and second elastomeric member portions are configured with at least one of differing elastomers and differing shapes to tune said damper.

4. The damper of claim 3, wherein said first and second elastomeric member portions are composed of the same elastomer.

5. The damper of claim 1, wherein said radial flange comprises a plurality of angularly-spaced flanges.

6. The damper of claim 1, wherein said compression ring is attached to said inertia mass by at least one of swaging, welding, and deformation of one of said inertia mass and said compression ring.

7. The damper of claim 1, where said compression ring includes an annular recess complementary to said annular channel.

8. The damper of claim 1, wherein said inertia mass encompasses at least a portion of said first and second faces of said radial flange.

9. The damper of claim 1, wherein at least one of said first and second portions of said elastomeric member is bonded to at least one of said inertia mass, radial flange, and compression ring.

10. A torsional vibration damper comprising:
   a hub having a spoked web, and a radial flange extending laterally from said spoked web, said flange having a first face and a second face;
   an inertia mass associated with said hub, said inertia mass comprising a front portion and rear portion, said front and rear portions together defining an annular channel encompassing said radial flange; wherein said inertia mass comprises a substantially continuous annular outer rim and an intermittent annular inner rim projecting through openings in said spoked web;
   a first elastomeric member portion disposed between said first face of said radial flange and said front portion of said inertia mass;
   a second elastomeric member portion disposed between said second face of said radial flange and said rear portion of said inertia mass, said first and second elastomeric member portions in compression within said annular channel.

11. The damper of claim 10, wherein said first and second elastomeric member portions are configured with at least one of differing elastomers and differing shapes to tune said damper.

12. The damper of claim 10, wherein said radial flange is tapered towards a vertex that substantially coincides with the axis of rotational inertia of the damper.

13. The damper of claim 10, wherein said radial flange comprises a plurality of angularly-spaced flanges.

* * * * *